(12) United States Patent
Ahn et al.

(10) Patent No.: US 9,155,079 B2
(45) Date of Patent: Oct. 6, 2015

(54) COMMUNICATION METHOD AND DEVICE IN A WIRELESS COMMUNICATION SYSTEM

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 13/881,351

(22) PCT Filed: Mar. 23, 2012

(86) PCT No.: PCT/KR2012/002098
§ 371 (c)(1),
(2), (4) Date: Apr. 24, 2013

(87) PCT Pub. No.: WO2012/134107
PCT Pub. Date: Oct. 4, 2012

(65) Prior Publication Data
US 2013/0223298 A1   Aug. 29, 2013

Related U.S. Application Data

(60) Provisional application No. 61/467,390, filed on Mar. 25, 2011.

(51) Int. Cl.
| | |
|---|---|
| H04W 72/04 | (2009.01) |
| H04L 1/00 | (2006.01) |
| H04L 5/00 | (2006.01) |
| H04L 1/18 | (2006.01) |
| H04W 28/18 | (2009.01) |
| H04B 7/26 | (2006.01) |

(52) U.S. Cl.
CPC ......... *H04W 72/0406* (2013.01); *H04B 7/2643* (2013.01); *H04L 1/0083* (2013.01); *H04L 1/1854* (2013.01); *H04L 5/001* (2013.01); *H04L 5/0096* (2013.01); *H04B 7/2662* (2013.01); *H04L 5/0055* (2013.01); *H04W 28/18* (2013.01)

(58) Field of Classification Search
USPC .................................. 370/280, 281, 329, 336
See application file for complete search history.

(56) References Cited

U.S. PATENT DOCUMENTS

| | | | |
|---|---|---|---|
| 2008/0137562 A1 | 6/2008 | Li et al. | |
| 2011/0176461 A1* | 7/2011 | Astely et al. | 370/280 |
| 2011/0211503 A1* | 9/2011 | Che et al. | 370/280 |

FOREIGN PATENT DOCUMENTS

| | | |
|---|---|---|
| CN | 1965513 | 5/2007 |
| CN | 101606347 | 12/2009 |

(Continued)

OTHER PUBLICATIONS

The State Intellectual Property Office of the People's Republic of China Application Serial No. 201280003640.7, Office Action dated Dec. 18, 2014, 9 pages.

*Primary Examiner* — Vincelas Louis
(74) *Attorney, Agent, or Firm* — Lee, Hong, Degerman, Kang & Waimey (57) ABSTRACT

According to the invention, a wireless device communicates with a base station by applying a first downlink-uplink (DL-UL) setting that sets a plurality of downlink subframes and a plurality of uplink subframes at different times. The wireless device communicates with the base station by using at least one auxiliary subframe when receiving a second UL-DL setting from the base station.

10 Claims, 8 Drawing Sheets

(56) References Cited

FOREIGN PATENT DOCUMENTS

| | | |
|---|---|---|
| CN | 101926214 | 12/2010 |
| KR | 10-2008-0092222 | 10/2008 |
| KR | 10-0937299 | 1/2010 |
| KR | 10-2010-0139062 | 12/2010 |
| WO | 2009/116754 | 9/2009 |
| WO | 2010/049587 | 5/2010 |
| WO | WO 2012113131 A1 * | 8/2012 ............ H04W 72/00 |

* cited by examiner

COMMUNICATION METHOD AND DEVICE IN A WIRELESS COMMUNICATION SYSTEM

CROSS-REFERENCE TO RELATED APPLICATIONS

This application is the National Stage filing under 35 U.S.C. 371 of International Application No. PCT/KR2012/002098, filed on Mar. 23, 2012, which claims the benefit of U.S. Provisional Application Ser. No. 61/467,390, filed on Mar. 25, 2011, the contents of which are all hereby incorporated by reference herein in their entirety.

BACKGROUND OF THE INVENTION

1. Field of the Invention

The present invention relates to wireless communications, and more particularly, to a communication method and device in a wireless communication system in which a downlink-uplink configuration is changed.

2. Related Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009 May) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The 3GPP LTE supports both frequency division duplex (FDD) and time division duplex (TDD). In the FDD, uplink (UL) transmission and downlink (DL) transmission use different frequencies. In the TDD, UL transmission and DL transmission use the same frequency. A user equipment supporting full duplex-FDD can simultaneously perform UL transmission and DL reception at a specific time. A user equipment supporting half-duplex-FDD (HD-FDD) and TDD can perform UL transmission and DL reception at different times.

In the TDD of 3GPP LTE, a DL subframe and a UL subframe coexist in one radio frame. When locations of the DL subframe and the UL subframe are predefined in the radio frame, it is called a DL-UL configuration.

In general, a wireless communication system has been designed by considering that there is almost no change when a base station uses a specific DL-UL configuration. This is because normal communication may be difficult when a mismatch occurs in the DL-UL configuration between the user equipment and the base station.

However, with the diversification of a type of a required service and with the increase in traffic, the base station needs to change the DL-UL configuration in a more flexible manner.

SUMMARY OF THE INVENTION

The present invention provides a communication method in a process of changing a downlink (DL)-uplink (UL) configuration, and a wireless device using the method.

In an aspect, a communication method in a wireless communication system includes communicating with a base station by applying a first downlink (DL)-uplink (UL) configuration that configures a plurality of DL subframes and a plurality of UL subframes at different times, communicating with the base station by using at least one auxiliary subframe upon receiving a second DL-UL configuration from the base station, and communicating with the base station by applying the second DL-UL configuration.

The at least one auxiliary subframe may include at least one DL subframe common to the first DL-UL configuration and the second DL-UL configuration.

The at least one auxiliary subframe may include at least one UL subframe common to the first DL-UL configuration and the second DL-UL configuration.

The at least one auxiliary subframe may be used during a specific time period until the second DL-UL configuration is applied.

The wireless communication system may be a time division duplex (TDD) system.

The wireless communication system may be a half duplex-frequency division duplex (HD-FDD) system.

In another aspect, a wireless device in a wireless communication system includes a radio frequency (RF) unit configured for transmitting and receiving a radio signal, and a processor operably coupled to the RF unit and configured to communicate with a base station by applying a first downlink (DL)-uplink (UL) configuration for configuring a plurality of DL subframes and a plurality of UL subframes at different times, communicate with the base station by using at least one auxiliary subframe upon receiving a second DL-UL configuration from the base station, and communicate with the base station by applying the second DL-UL configuration.

The present invention can prevent communication reliability deterioration which occurs when a downlink (DL)-uplink (UL) configuration is mismatched between a base station and a user equipment.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
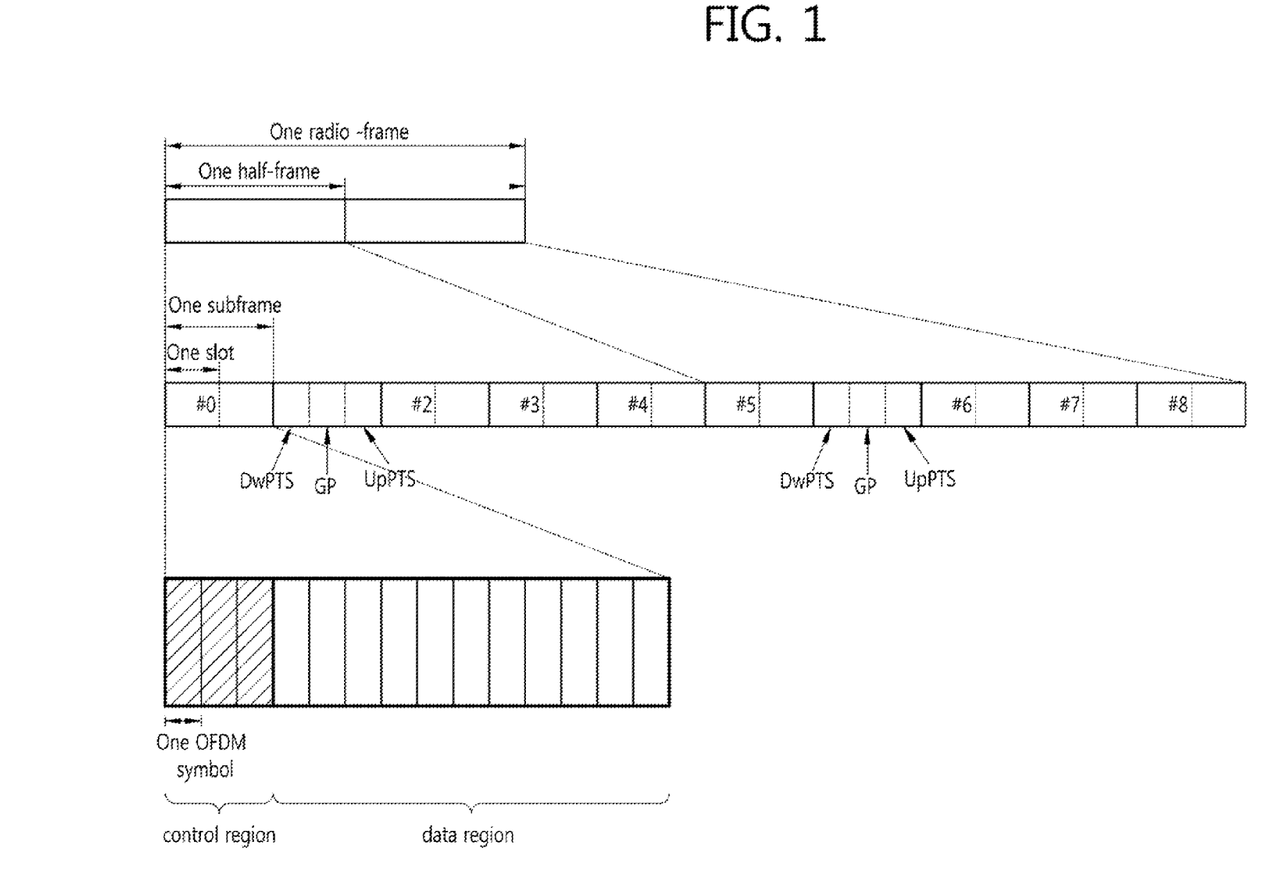
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 4 of 3GPP TS 36.211 V8.7.0 (2009 May) "Evolved Universal Terrestrial Radio Access (E-UTRA); Physical Channels and Modulation (Release 8)" can be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in four preceding OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
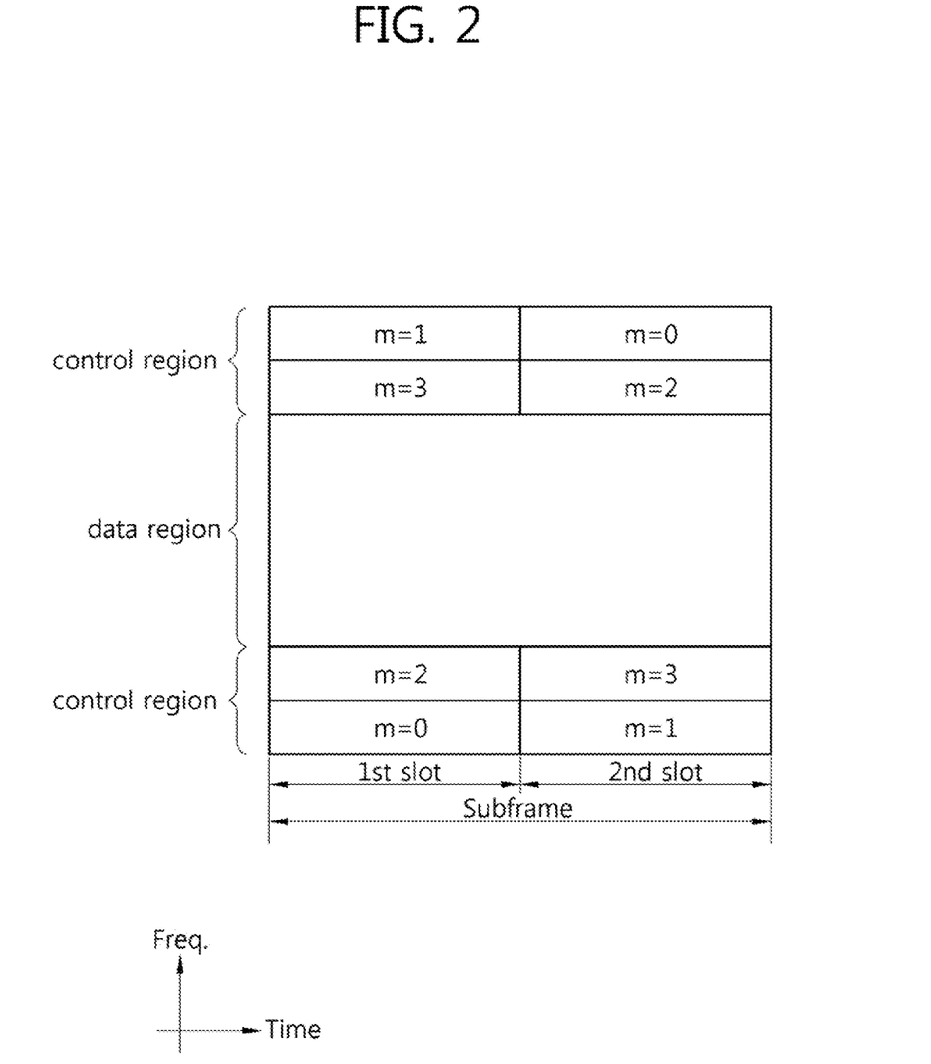
FIG. 2 shows a structure of an uplink (UL) subframe in 3GPP LTE.

FIG. 2 shows a structure of a UL subframe in 3GPP LTE.

The UL subframe can be divided into a control region and a data region. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

In order to receive DL data, the UE first receives a DL resource allocation (or a DL grant) on the PDCCH. When PDCCH detection is successful, the UE reads the DCI on the PDCCH. By using the DL resource allocation in the DCI, DL data on the PDSCH is received. In addition, in order to transmit UL data, the UE first receives a UL resource allocation on the PDCCH. When PDCCH detection is successful, the UE reads the DCI on the PDCCH. By using the UL resource allocation in the DCI, UL data on the PUSCH is transmitted.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. That is, in the synchronous HARQ, initial transmission and retransmission are performed with an HARQ period.

Figure 3:
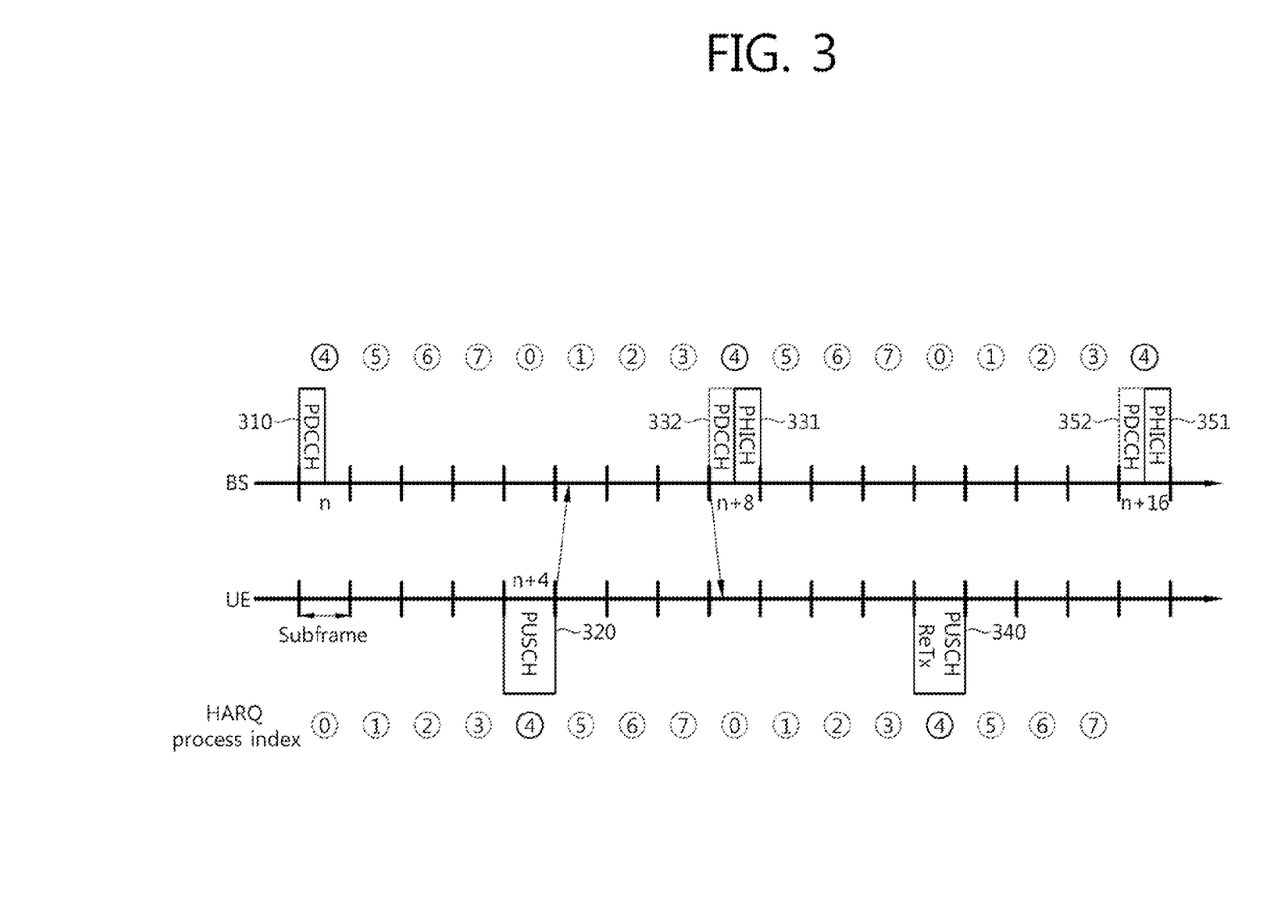
FIG. 3 shows UL synchronous uplink hybrid automatic repeat request (HARQ) in 3GPP LTE.

FIG. 3 shows UL synchronous HARQ in 3GPP LTE.

A UE receives an initial UL grant on a PDCCH 310 from a BS in an $n^{th}$ subframe.

The UE transmits a UL transport block on a PUSCH 320 by using the initial UL grant in an $(n+4)^{th}$ subframe.

The BS sends an ACK/NACK signal for the UL transport block on a PHICH 331 in an $(n+8)^{th}$ subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL grant on a PDCCH 332, or may not send an additional UL grant.

Upon receiving the NACK signal, the UE sends a retransmission block on a PUSCH 340 in an $(n+12)^{th}$ subframe. For the transmission of the retransmission block, if the retransmission UL grant is received on the PDCCH 332, the UE uses the retransmission UL grant, and if the retransmission UL grant is not received, the UE uses the initial UL grant.

The BS sends an ACK/NACK signal for the UL transport block on a PHICH 351 in an $(n+16)^{th}$ subframe. When the ACK/NACK signal is the NACK signal, the BS may send a retransmission UL grant on a PDCCH 352, or may not send an additional UL grant.

After initial transmission is performed in the $(n+4)^{th}$ subframe, retransmission is performed in the $(n+12)^{th}$ subframe, and thus synchronous HARQ is performed with an HARQ period corresponding to 8 subframes.

In frequency division duplex (FDD) of 3GPP LTE, 8 HARQ processes can be performed, and the respective HARQ processes are indexed from 0 to 7.

In the TDD, the number of HARA processes is determined as shown in Table 2 below, according to the DL-UL configuration of Table 1.

TABLE 2

| TDD DL-UL configuration | The number of HARQ processes for normal HARQ operation | The number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

For the TDD UL-DL configurations 1 to 6 and the normal HARQ operation, the UE performs PUSCH transmission corresponding to a subframe n+k upon detection of PDCCH and/or PHICH transmission having a UL grant in a subframe n. k is given by Table 3 below.

TABLE 3

| UL-DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 6 | | | | 4 | 6 | |
| 1 | | | 6 | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

The section 8 of 3GPP TS 36.213 V8.7.0 (2009 May) regarding the DL-UL configuration 0 and the subframe bundling operation can be incorporated herein by reference.

In the FDD, it can be said that ACK/NACK carried by a PHICH received in a subframe i is associated with PUSCH transmission in a subframe i−4.

In the DL-UL configurations 1 to 6 of the TDD, it can be said that ACK/NACK carried by a PHICH received in a subframe i is associated with PUSCH transmission in a subframe i−k. k is given by Table 4 below.

TABLE 4

| UL-DL configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

The UE receives a PHICH in a subframe $n+k_{PHICH}$ in accordance with PUSCH transmission scheduled in a subframe n. In the FDD, $k_{PHICH}$ is always 4. In the TDD, $k_{PHICH}$ is given by Table 5 below.

TABLE 5

| UL-DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |

TABLE 5-continued

| UL-DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

In a subframe $n+k_{PHICH}$, the UE identifies a PHICH resource by using an index pair ($n^{group}_{PHICH}$, $n^{seq}_{PHICH}$). A PHICH group index $n^{group}_{PHICH}$ has a value in the range of 0 to $N^{group}_{PHICH}-1$. An orthogonal sequence index $n^{seq}_{PHICH}$ denotes an index of an orthogonal sequence.

An index pair ($n^{group}_{PHICH}$, $n^{seq}_{PHICH}$) is obtained according to Equation 1 below.

$$n_{PHICH}^{group}=(I_{PRB\_RA}^{lowest\_index}+n_{DMRS}) \bmod N_{PHICH}^{group}+I_{PHICH}N_{PHICH}^{group}$$

$$n_{PHICH}^{seq}=(\text{floor}(I_{PRB\_RA}^{lowest\_index}/N_{PHICH}^{group})+n_{DMRS}) \bmod 2N_{SF}^{PHICH} \quad \text{[Equation 1]}$$

Herein, $n_{DMRS}$ denotes a cyclic shift of a demodulation reference signal (DMRS) in a latest UL grant for a transport block associated with corresponding PUSCH transmission. The DMRS is an RS used in PUSCH transmission. $N^{PHICH}_{SF}$ denotes an SF size of an orthogonal sequence used in PHICH modulation. $I^{lowest\_index}_{PRB\_RA}$ is the smallest PRB index in a first slot of corresponding PUSCH transmission. $I_{PHICH}$ has a value of 0 or 1. The number $N^{group}_{PHICH}$ of PHICH groups is a parameter configured by using higher layer signaling.

ceil(x) is a function for outputting a minimum value among integers greater than or equal to x. floor(x) is a function for outputting a maximum value among integers less than or equal to x.

Figure 4:
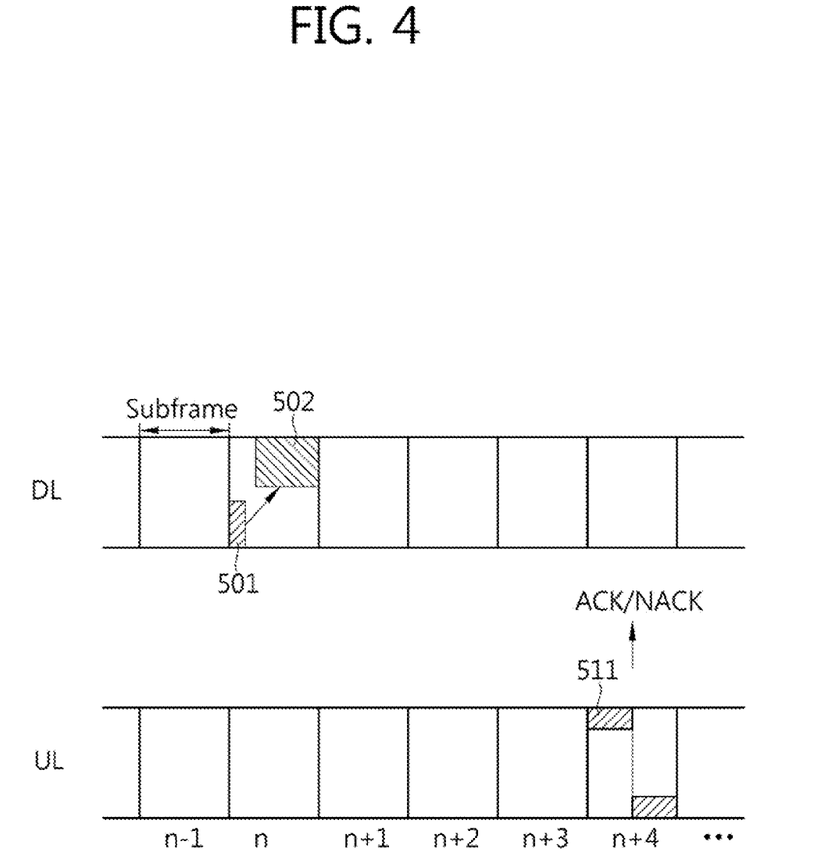
FIG. 4 shows an example of performing downlink (DL) HARQ in 3GPP LTE.

FIG. 4 shows an example of performing DL HARQ in 3GPP LTE.

By monitoring a PDCCH, a UE receives a DL resource allocation (or a DL grant) on a PDCCH 501 in an $n^{th}$ DL subframe. The UE receives a DL transport block through a PDSCH 502 indicated by the DL resource allocation.

The UE transmits an ACK/NACK signal for the DL transport block on a PUCCH 511 in an $(n+4)^{th}$ UL subframe. The ACK/NACK signal can be regarded as a reception acknowledgement for the DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a PUCCH resource for the PUCCH 511, the UE uses a resource allocation of the PDCCH 501. The PUCCH resource is determined based on a lowest CCE index (or an index of a first CCE) used for transmission of the PDCCH 501. An index used to determine the PUCCH resource is called a resource index.

Unlike frequency division duplex (FDD), a UL subframe and a DL subframe coexist in one radio frame in TDD. In general, the number of UL subframes is less than the number of DL subframes. Therefore, UL subframes for transmitting an ACK/NACK signal are insufficient, and thus it is supported to transmit a plurality of ACK/NACK signals for a plurality of DL transport blocks in one UL subframe. According to the section 10.1 of 3GPP TS 36.213 V8.7.0 (2009 May), two ACK/NACK modes, i.e., channel selection and bundling, are introduced.

First, bundling is an operation in which ACK is transmitted when decoding of all PDSCHs (i.e., DL transport blocks) received by a UE is successful, and otherwise NACK is transmitted.

Second, channel selection is also called ACK/NACK multiplexing. The UE transmits ACK/NACK by selecting a plurality of reserved PUCCH resources.

Table 6 below shows a DL subframe n−k associated with a UL subframe n depending on the UL-DL configuration in 3GPP LTE. Herein, k∈K, where M is the number of elements of a set K.

TABLE 6

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in the UL-DL configuration 5, the UL subframe 2 is associated with 9 DL subframes {13, 12, 9, 8, 7, 5, 4, 11, 6}.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC can be mapped to one cell. Therefore, when a UE communicates with a BS through a plurality of CCs, it can be said that the UE receives a service from a plurality of serving cells.

Figure 5:
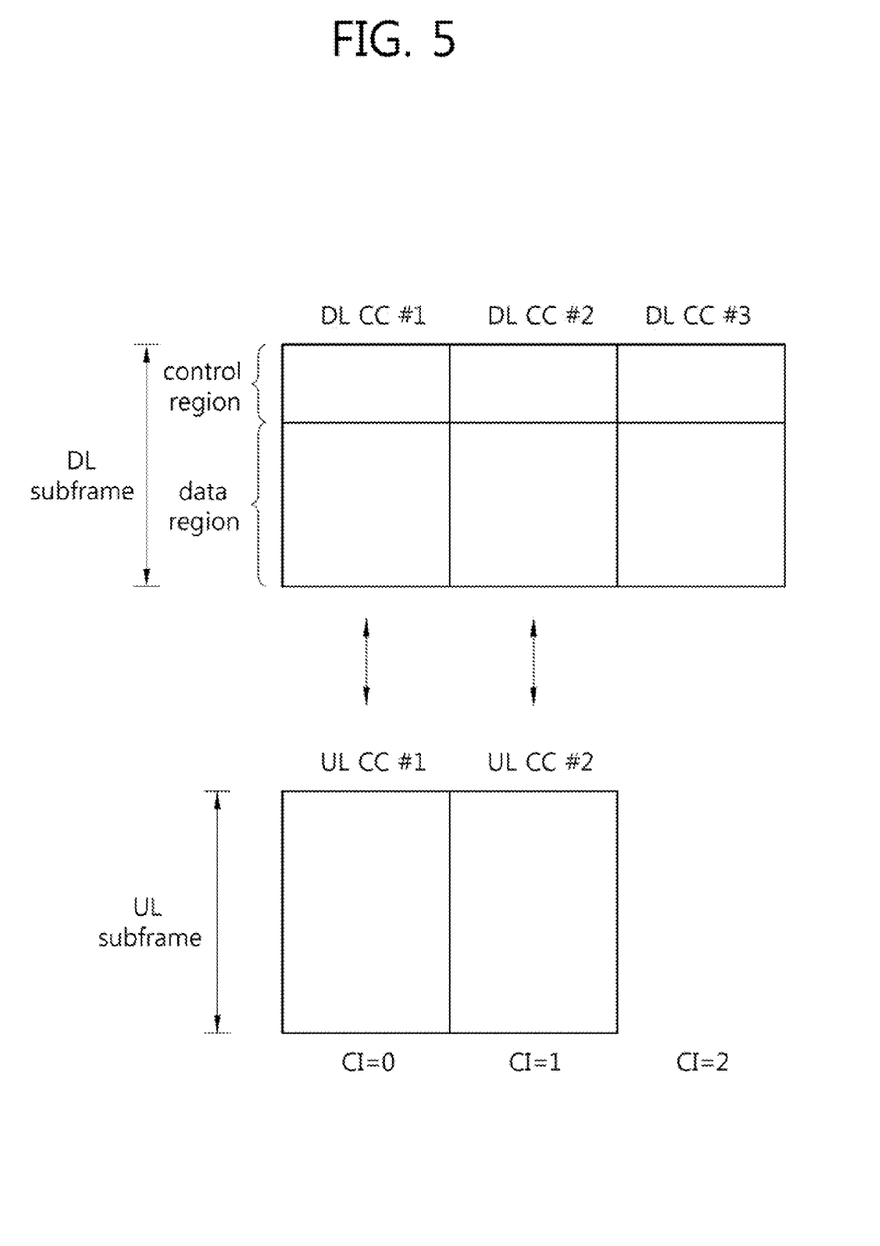
FIG. 5 shows an example of multiple carriers.

FIG. 5 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously via a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by using higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

In general, in the TDD system, a DL-UL configuration is repeated in a specific time unit. In the 3GPP LTE TDD system, the DL-UL configuration can be repeated in a radio frame unit.

A network can modify the DL-UL configuration according to a change in an interference environment or a traffic situation. In this case, as described above, DL HARQ timing, UL HARQ timing, or the like varies depending on the DL-UL configuration. The DL-UL configuration may be mismatched between the BS and the UE while the existing DL-UL configuration is changed to a new DL-UL configuration. There may be a duration in which the BS transmits the new DL-UL configuration but the UE fails to apply the new DL-UL configuration.

Figure 6:
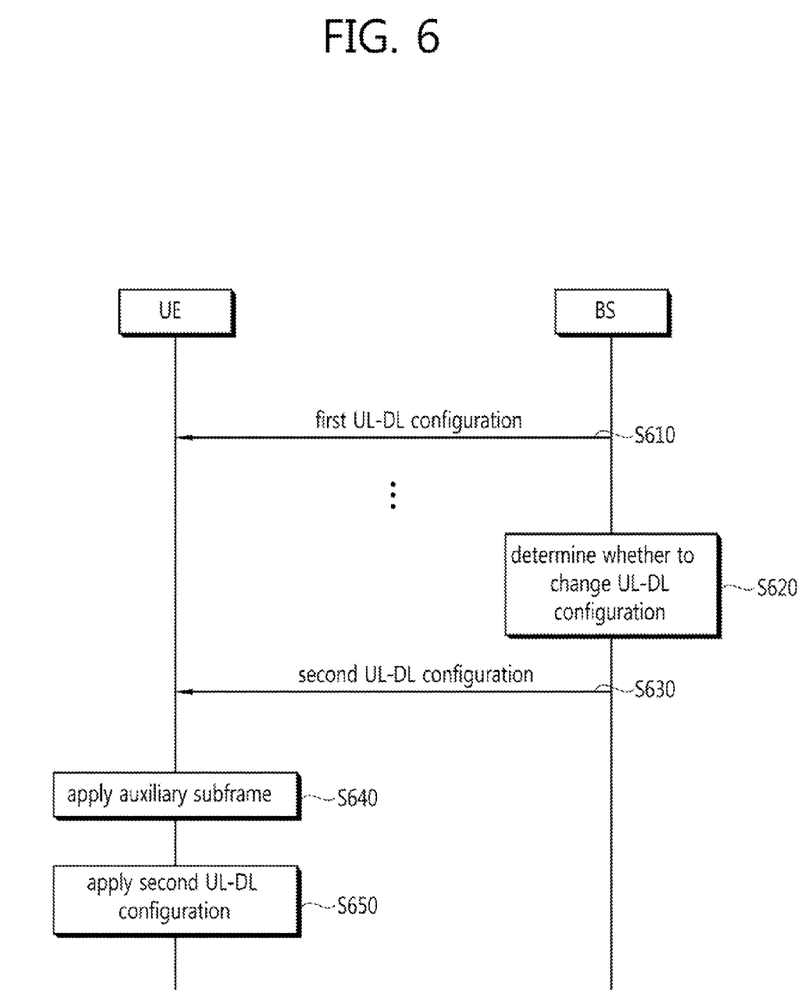
FIG. 6 is a flowchart showing a communication method according to an embodiment of the present invention.

FIG. 6 is a flowchart showing a communication method according to an embodiment of the present invention.

In step S610, a BS transmits a first UL-DL configuration to a UE, and the UE communicates with the BS by applying the first UL-DL configuration.

In step S620, the BS determines whether to change the UL-DL configuration. The BS can change the DL-UL configuration according to a change in an interference environment or a traffic situation.

In step S630, the BS transmits a second UL-DL configuration to the UE. The second UL-DL configuration is a DL-UL configuration which overrides the first UL-DL configuration.

The second DL-UL configuration can be received by using system information. Alternatively, the second DL-UL configuration can be received by using at least any one of an RRC message, a MAC message, and a physical channel. The second DL-UL configuration can be received by using a message which activates or deactivates a secondary cell.

In step S640, the UE communicates with the BS by using an auxiliary subframe before applying the second DL-UL configuration. Upon receiving a new DL-UL configuration which overrides the existing DL-UL configuration, the auxiliary subframe includes a DL subframe and/or a UL subframe to be used temporarily.

The auxiliary subframe can be used during a specific period (called a reconfiguration period) before applying the second DL-UL configuration. For example, when the second DL-UL configuration is received in a subframe n, the auxiliary subframe can be used until a subframe n+k. Herein, k>1. For example, k=8. The value k may be predetermined or may be reported by the BS to the UE.

The auxiliary subframe can be used during a timer is running. The timer starts upon receiving the second DL-UL configuration. At the expiry of the timer, the reconfiguration period ends and the second UL-DL configuration is applied. A timer value may be predetermined or may be reported by the BS to the UE.

In step S650, the UE communicates with the BS by applying the second UL-DL configuration.

The auxiliary subframe may include a DL subframe and/or a UL subframe which are common to the first DL-UL configuration and the second UL-DL configuration. Among subframes which are DL subframes common to both the first DL-UL configuration and the second UL-DL configuration, at least one of subframes may be designated as the auxiliary subframe. Among subframes which are UL subframes common to both the first DL-UL configuration and the second UL-DL configuration, at least one of subframes may be designated as the auxiliary subframe. For example, assume that the first DL-UL configuration conforms to the DL-UL configuration 1 of Table 1, and the second DL-UL configuration conforms to the DL-UL configuration 2 of Table 1. The auxiliary subframe may include at least any one of subframes 0, 5, and 9 which are common DL subframes and at least any one of subframes 2 and 7 which are common UL subframes.

During a period of reconfiguring from the first DL-UL configuration to the second UL-DL configuration, the UE and the BS can transmit or receive data and control information through the auxiliary subframe. The UE may ignore PDSCH/PUSCH scheduling, PDSCH/PUSCH retransmission, PHICH reception, UL ACK/NACK transmission, etc., with respect to subframes which are not auxiliary subframes.

The auxiliary subframe may be used to receive system information, broadcast information, and control information, and transmission of the PUSCH/PUCCH used in transmission of UE-specific data may be restricted.

The auxiliary subframe may include only a DL subframe. UL ACK/NACK may be transmitted according to a PDSCH received through an auxiliary DL subframe. The PUSCH may be transmitted according to a UL grant received through the auxiliary DL subframe.

The auxiliary subframe may include only a UL subframe. The BS may schedule DL PDSCH/PDCCH transmission according to UL ACK/NACK and/or PUSCH transmission timing of an auxiliary UL subframe.

A DL/UL subframe which is common to all DL-UL configurations may be defined as the auxiliary subframe. For example, in Table 1, the subframes 0 and 5 are DL subframes in all DL-UL configurations, and the subframe 2 is a UL subframe in all DL-UL configurations. The auxiliary subframe may include at least any one of the subframes 0, 2, and 5.

The DL-UL configurations can be divided into a plurality of groups, and the auxiliary subframe can be defined for each group. For example, in Table 1, the configurations can be divided into a first group (i.e., the UL-DL configurations 0, 1, 2, and 6) having a switching point periodicity of 5 ms and a second group (i.e., the UL-DL configurations 3, 4, and 5) having switching point periodicity of 10 ms, and a DL/UL subframe which is common to the respective groups can be defined as the auxiliary subframe. For example, regarding a DL-UL configuration belonging to the first group, the auxiliary subframe may include at least any one of subframes 0, 2, 5, and 7. Regarding a DL-UL configuration belonging to the second group, the auxiliary subframe may include at least any one of the subframes 0, 2, 5, 6, 7, and 8.

The auxiliary subframe may be configured by the BS. Information on the auxiliary subframe may be included in a message including the second DL-UL configuration.

Considering the DL-UL configurations 0 and 1, in Table 3, a PDSCH of a UL subframe 2 is scheduled by a PDCCH of a DL subframe 6. In Table 4, a PHICH for a PUSCH of a UL subframe 2 is transmitted through a DL subframe 6. In Table 6, ACK/NACK for a PDSCH of a DL subframe 6 is transmitted through a UL subframe 2. Accordingly, when reconfiguration is achieved between the DL-UL configurations 0 and 1, the auxiliary subframe may include at least any one of the subframes 2 and 6.

During a reconfiguration period in which communication is performed by using the auxiliary subframe, a DL/UL state is ambiguous with respect to subframes which are not the auxiliary DL subframe. Thus, whether the UE is able to measure DL channel state information (CSI) or radio link quality becomes ambiguous. It can be restricted that a DL channel state is not measured for the subframes which are not the auxiliary DL subframe.

Some of functions may be restricted in the subframes which are not the auxiliary DL. For example, a semi-persistent scheduling (SPS) PDSCH may not be transmitted in the subframes which are not the auxiliary DL subframe. Even if the SPS PDSCH is transmitted, retransmission may not be performed on the SPS PDSCH. Alternatively, it can be restricted that retransmission is performed only in the auxiliary DL subframe.

It can be restricted that the CSI is not reported or a sounding reference signal (SRS) is not transmitted in subframes which are not the auxiliary UL subframe. The SPS PUSCH may not be transmitted in the subframes which are not the auxiliary UL subframe. Even if the SPS PUSCH is transmitted, retransmission may not be performed on the SPS PUSCH. Alternatively, it can be restricted that retransmission is performed only in the auxiliary UL subframe.

DL channel state reporting and/or SRS transmission may be prohibited during the reconfiguration period.

Although it is described that the auxiliary subframe is used between the first DL-UL configuration and the second DL-UL configuration in the aforementioned embodiment, DL transmission or UL transmission may be fixed only in a DL subframe and/or a UL subframe corresponding to the auxiliary subframe, and the remaining subframes may be used according to scheduling of the BS. For one example, assume that the UL subframe 2 and the DL subframe 6 are configured as auxiliary subframes. Only UL transmission is possible in the auxiliary UL subframe 2, and only DL transmission is possible in the auxiliary DL subframe 6. The BS can randomly schedule UL transmission or DL transmission in the subframe 0 which is not the auxiliary subframe. For another example, assume that the DL subframe 0 and the UL subframe 5 are configured as auxiliary subframes. Only DL transmission is possible in the auxiliary DL subframes 0 and 5, and the BS can randomly schedule UL transmission or DL transmission in subframes which are not the auxiliary subframes.

Although the TDD system is described for example in the aforementioned embodiment, the present invention is also applicable to various systems in which DL transmission and UL transmission are achieved at different times.

Figure 7:
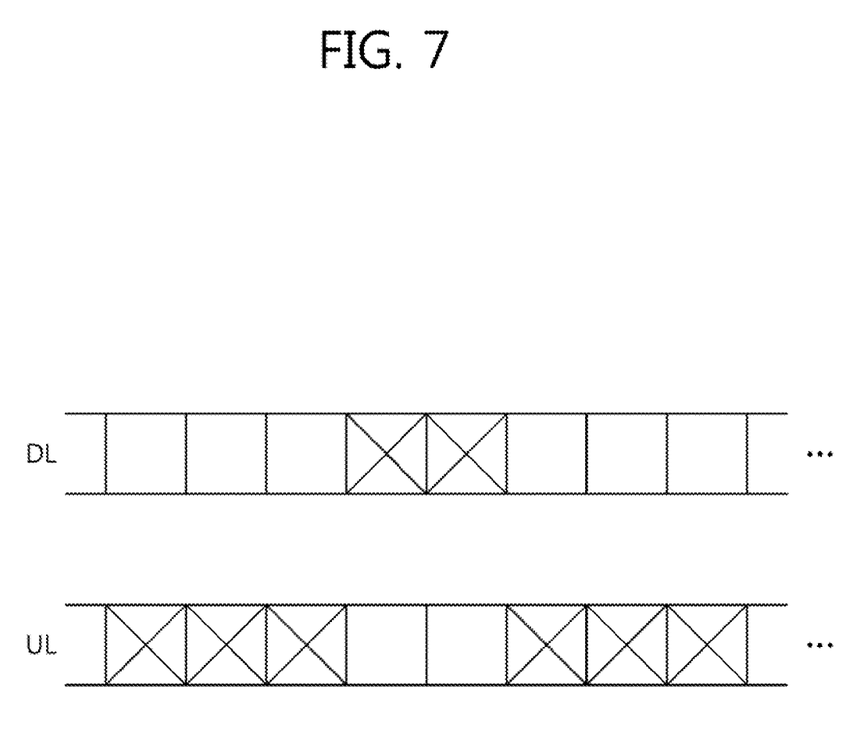
FIG. 7 shows half duplex-frequency division duplex (FDD).

FIG. 7 shows half duplex-frequency division duplex (FDD). In the half duplex-FDD, UL transmission and DL transmission use different frequencies, but UL transmission and DL transmission cannot be simultaneously performed. In a half duplex-FDD system, a DL-UL configuration can also be defined, and the proposed auxiliary subframe is applicable during a reconfiguration period.

Although the DL-UL reconfiguration of the UE is described for example in the aforementioned embodiment, the proposed invention is also applicable to a DL-UL reconfiguration of a machine to machine (M2) device or a machine-type communication (MTC) device. MTC communication is one type of data communication including one or more entities not requiring human interactions. That is, the M2M communication refers to the concept of communication based on the existing wireless communication network used by a machine device instead of a UE used by a user. The machine device used in the M2M communication can be called a M2M device. There are various M2M devices such as a vending machine, a machine for measuring a water level at a dam, etc.

Figure 8:
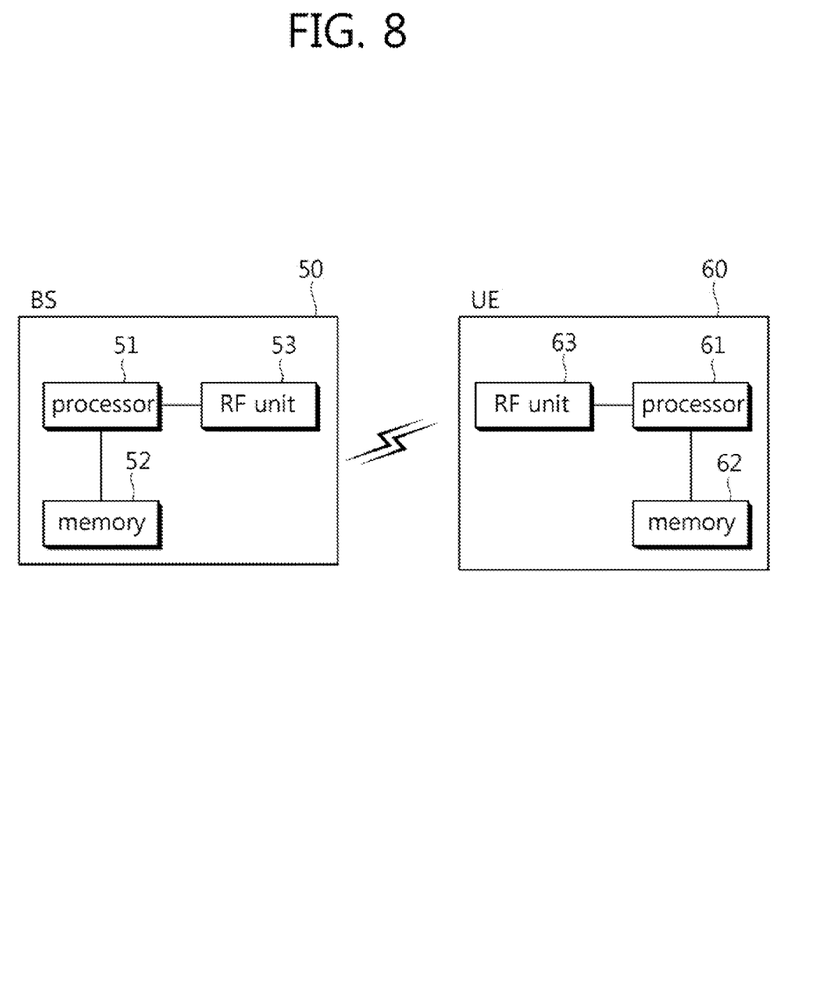
FIG. 8 is a block diagram showing a wireless communication system according to an embodiment of the present invention.

FIG. 8 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, processes, and/or methods. In the aforementioned embodiments of FIG. 6, the operation of the BS 50 can be implemented by the processor 51. The processor 51 manages a DL-UL configuration, and optionally can change the DL-UL configuration.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, processes, and/or methods. In the aforementioned embodiments of FIG. 6, the operation of the UE 60 can be implemented by the processor 61. The processor 61 communicates with the BS 50 by applying a DL-UL configuration, and configures an auxiliary subframe during a reconfiguration period.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A communication method in a wireless communication system, comprising:

communicating with a base station by applying a first downlink (DL)-uplink (UL) configuration that configures a plurality of DL subframes and a plurality of UL subframes at different times;

receiving, from the base station, a second DL-UL configuration which overrides the first UL-DL configuration;

temporarily communicating with the base station by using at least one auxiliary subframe upon receiving the second DL-UL configuration from the base station and before applying the second DL-UL configuration; and communicating with the base station by applying the second DL-UL configuration, wherein the at least one auxiliary subframe includes at least one DL subframe or at least one UL subframe common to the first DL-UL configuration and the second DL-UL configuration, wherein the at least one auxiliary subframe is used while a timer is running, and the timer starts upon receiving the second DL-UL configuration.

2. The communication method of claim 1, wherein the at least one auxiliary subframe is predefined.

3. The communication method of claim 1, wherein information on the at least one auxiliary subframe is received from the base station.

4. The communication method of claim 1, wherein the at least one auxiliary subframe is used during a specific time period until the second DL-UL configuration is applied.

5. The communication method of claim 1, wherein the wireless communication system is a time division duplex (TDD) system.

6. The communication method of claim 1, wherein the wireless communication system is a half duplex-frequency division duplex (HD-FDD) system.

7. A wireless device in a wireless communication system, comprising:

a radio frequency (RF) unit configured for transmitting and receiving a radio signal; and a processor operably coupled to the RF unit and configured to:

communicate with a base station by applying a first downlink (DL)-uplink (UL) configuration for configuring a plurality of DL subframes and a plurality of UL subframes at different times;

receive, from the base station, a second DL-UL configuration which overrides the first UL-DL configuration;

temporarily communicate with the base station by using at least one auxiliary subframe upon receiving the second DL-UL configuration from the base station and before applying the second DL-UL configuration; and communicate with the base station by applying the second DL-UL configuration, wherein the at least one auxiliary subframe includes at least one DL subframe or at least one UL subframe common to the first DL-UL configuration and the second DL-UL configuration, wherein the at least one auxiliary subframe is used while a timer is running, and the timer starts upon receiving the second DL-UL configuration.

8. The wireless device of claim 7, wherein the at least one auxiliary subframe is predefined.

9. The wireless device of claim 7, wherein the at least one auxiliary subframe is used during a specific time period until the second DL-UL configuration is applied.

10. The wireless device of claim 7, wherein the wireless device supports time division duplex (TDD) or half-duplex-frequency division duplex (HD-FDD).

* * * * *